June 4, 1968 J. H. MOGARD 3,386,887

FUEL ELEMENT FOR A NUCLEAR REACTOR

Original Filed July 6, 1965

Inventor
JOHAN HILDING MOGARD

[United States Patent Office — 3,386,887 — Patented June 4, 1968]

3,386,887
FUEL ELEMENT FOR A NUCLEAR REACTOR

Johan Hilding Mogard, Lidingo, Sweden, assignor to Aktiebolaget Atomenergi, Stockholm, Sweden, a Swedish company
Continuation of application Ser. No. 469,490, July 6, 1965. This application Sept. 26, 1966, Ser. No. 582,093
Claims priority, application Sweden, July 24, 1964, 9,022/64
1 Claim. (Cl. 176—72)

ABSTRACT OF THE DISCLOSURE

A nuclear reactor fuel element of the combined boiler-superheater type comprises a fissile fuel body having spaced recessed portions on its surface and a cladding over the fuel body which contacts those portions of the body surface which are not recessed. The resulting recesses are either gas-filled or vacated so as to constitute a heat insulation. A desired control of the heat flux is effected by varying the width or depth of the recesses in one zone of the fuel body with respect to the recesses in a second spaced zone. Preferably, the said zones are axially disposed along the fuel element, whereby, for example, the heat flux on the steam side of the element may be graduated in its intensity from one zone to another in series.

---

This is a continuation of my patent application Ser. No. 469,490, filed July 6, 1965, and now abandoned.

The invention relates to a fuel element for a nuclear reactor, comprising a body of fissile material, a protective coating on the surface of the body, and a heat insulating layer between the fuel body and the protective coating.

It is desired in some types of fuel elements for nuclear reactors to provide a heat insulating layer between the fuel body and the protective layer, in order to reduce the heat flux from the fuel body or to direct it in a particular direction. An example of such a fuel element will be given below. The described element is a tubular element having a heat insulation on its inner wall. It may sometimes be desired to provide a heat insulation on the outer wall of a tubular element. In other elements it may be desired to provide a heat insulation on predetermined portions of the outer surface of a homogeneous rod of a fissile fuel. It has been suggested to use, for example, a metal oxide having a high melting point for said heat insulating layer. The introduction of a metal oxide into the fuel element involves, however, a complicated operation of manufacture. Furthermore, the neutron absorption of the element will be increased, which is not desired.

According to the invention a heat insulating layer is obtained in a simple way without any foreign material being introduced into the element. The fuel element of the invention is characterized in that the heat insulating layer consists of a gas-filled or evacuated space formed by recessed portions on the surface of the fuel body.

The recessed portions may have any desired shape. It is essential that the protruding portions between the recessed portions keep the protective coating at a defined distance from the surface of the recessed portions. In a metal fuel body, for instance a body consisting of natural uranium, the recessed portions may be produced with known metal working processes. In a ceramic fuel body, for instance a body consisting of uranium oxide, having been produced by compressing a ceramic powder to form a body and sintering said body it is suitable to produce the recessed portions on the surface of the fuel body while the ceramic powder is being compressed.

Figure 1:
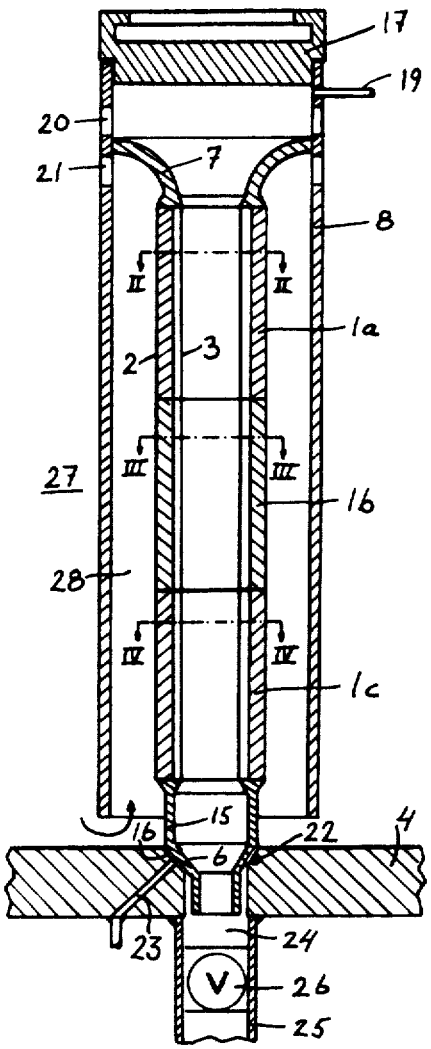
Figure 2:
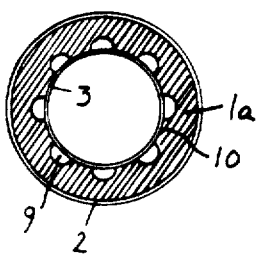
Figure 3:
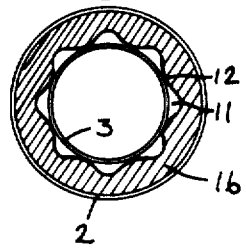
Figure 4:
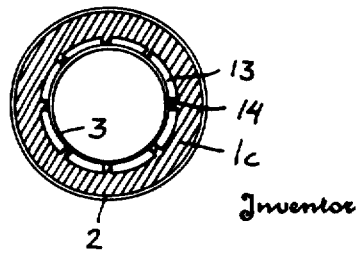

The heat insulation produced by the recessed portions is determined by the depth and width of the recessed portions. The accompanying drawing, which illustrates the invention, shows three types of recessed portions, producing different degrees of heat insulation. The fuel element shown, as an example on the drawing is a tubular combined boiler and superheater element, the outside of the tube being cooled by boiling water, the produced steam being passed downward inside the tube while being superheated. In the illustrated element the object of the heat insulation is to reduce the heat flux to the steam side while increasing the heat flux to the water side, thus increasing the total energy of the element. FIG. 1 shows a vertical cross-section of the element. FIGS. 2, 3 and 4 show on a larger scale cross-sections along the lines II—II, III—III and IV—IV of FIG. 1.

The fuel element 1 according to FIGS. 1–4 consists of three tubular bodies 1a, 1b and 1c enclosed between an outer tubular protective coating 2 and an inner tubular protective coating 3. The fuel element thus composed has a lower extended portion 15 having a conical portion 6 supported on a conical seat 16 of an opening 24 in the bottom 4 of the reactor core. The conical seat 16 contains a groove 22 communicating with a duct 23. The opening 24 communicates with a duct 25 which can be closed by means of a valve 26. The fuel element supports on its top a funnel-shaped member 7 having its upper edge abutting on the inside of a tube 8 surrounding the element 1 concentrically. The top of the tube 8 is closed by a plug 17 and has two series of openings 20 and 21 in its wall, at different heights. A pipe 19 is provided in the top of the tube 8 for the supply of water. Tube 8 is disposed in a moderator space—identified at 27—adapted to be filled with, or to contain water.

The device described so far operates in this way. The water in the space 27 outside the tube 8 acts as a moderator and flows from below into the space 28 between the tube 8 and the fuel element 1, flowing upward through said space while boiling. The mixture of steam and water flows out through the openings 21. The water flows back to the moderator space 27 and the steam flows through the openings 20 into the tube 8 and down through the fuel element 1 while being superheated. When the fuel element is to be changed the valve 26 is closed, the plug 17 is removed, and cooling water is supplied through the pipe 19. Now pressurized water is supplied through the duct 23, resulting in the fuel element being lifted from the seat 16. The fuel element is now lifted up from the tube 8 by a lifting member in a known way, and a new fuel element is inserted. No cooling water has to be supplied through the pipe 19 if the fuel element is changed while the entire reactor is shut off.

The inner surface of the tubular fuel body 1a has vertical grooves 9 having approximately a semicircular cross-section. The grooves are gas-filled, consequently forming heat insulating spaces between the surface of the fissile fuel and the protective coating 3. The cylindrical surface 10 of the fuel between two adjacent grooves is in contact with the protective coating 3.

The fuel body 1b, too, has vertical grooves 11, but these grooves have such a shape as to produce a wavy structure on the surface of the fuel body. Only the protruding portions 12 of the wavy surface are in contact with the protective coating 3.

The inner surface of the fuel body 1c has vertical grooves 13 of a large width, separated by narrow portions 14 which are in contact with the protective coating 3. The grooves 13 have a constant depth, i.e. the heat insulating space between the bottom of the grooves and the protective layer 3 has the same thickness at all places.

The spaces 9 have the lowest heat insulating capacity of the three embodiments illustrated in FIGS. 2–4, and the spaces 13 have the highest heat insulating capacity.

Consequently, a comparatively large part of the heat produced in the fuel body 1c will be directed outwardly to heat the water in the boiler space 28, whereas a comparatively small part of said heat will be utilized for superheating the steam. In the middle portion of the fuel element a comparatively smaller part of the heat produced in the fuel body 1b will be directed outwardly for heating the water. In the upper portion of the fuel element a still smaller part of the heat produced in the fuel body 1a will be directed outwardly for heating the water, whereas a comparatively large part of said heat will be utilized for superheating the steam. This is consistent with the natural cooling capacity, as the water has its highest cooling capacity at the bottom of the fuel element, whereas the steam has its highest cooling capacity at the top of the fuel element.

I claim:

1. A nuclear reactor fuel element of the combined boiler-superheater type wherein the outside of a fuel element is cooled by boiling water while the produced steam is superheated in passage through a bore in said fuel element, which comprises
 - a fissile fuel body in the form of a generally vertical tube composed of at least two discrete parts in series with respect to the axis of the tubular body;
 - a protective coating covering the exterior of said tubular body;
 - a protective coating on the inside of said tubular body;
 - the inner surface of said vertical tube being indented by spaced recessed portions generally parallel to the longitudinal axis of the tube;
 - said protective coating contacting the non-recessed portions of the inner surface of the tube while being spaced from the recessed portions to provide heat-insulating spaces limited inwardly by the inner surface of said tube and outwardly by said protective coating, the depth and width of said recessed portions determining the extent and spatial location of heat insulation effected by said spaces;
 - said recessed portions being in at least two zones located in at least two of said parts and axially disposed over the inner surface of said vertical tube, the recesses in one of said zones being smaller in extent than are the recesses in a second of said zones and hence affording a lesser extent of heat insulation than is afforded by the recessed portions in said second zone.

References Cited

UNITED STATES PATENTS

| | | | |
|---|---|---|---|
| 3,043,761 | 7/1962 | Reynolds | 176—67 |
| 3,072,555 | 1/1963 | Barth et al. | 176—72 X |
| 3,135,665 | 6/1964 | Koutz et al. | 176—83 X |
| 3,184,392 | 5/1965 | Blake | 176—67 |
| 3,189,101 | 6/1965 | Blake | 176—72 |
| 3,331,746 | 7/1967 | Margen | 176—72 X |

FOREIGN PATENTS 798,282  7/1958  Great Britain.

CARL D. QUARFORTH, *Primary Examiner.*

M. J. SCOLNICK, *Assistant Examiner.*